United States Patent Office 3,358,333
Patented Dec. 19, 1967

3,358,333
TWO-STATION INJECTION SOLE MOLDING
MACHINES
Charles J. Kitchener and Paul W. Senfleben, Beverly,
William P. Crossen, Magnolia, Robert J. Desmond,
Ipswich, and Jack A. Card, Beverly, Mass., assignors
to United Shoe Machinery Corporation, Flemington,
N.J., a corporation of New Jersey
Filed Apr. 30, 1965, Ser. No. 452,213
8 Claims. (Cl. 18—30)

ABSTRACT OF THE DISCLOSURE

An injection molding machine for molding soles onto lasted uppers. The machine is provided with footforms for receiving footwear uppers. A mold assembly cooperates with a footform having an upper mounted thereon to define a mold cavity. Means are provided for heating the upper and for cooling the mold assembly as well as means for charging the mold cavity with the injection molding material.

This invention relates to injection molding machines and is herein illustrated in its application to machines for molding and attaching sole and heel units to the bottoms of lasted footwear. A machine of this type is disclosed, for example, in U.S. patent application Serial No. 388,070, filed August 7, 1964, in the names of Leslie C. Battell et al.

The patent application above referred to discloses a machine designed for production of shoes having sole and heel units molded in situ thereon. There has evolved a demand for a machine of this type which will afford means for string lasting an upper on a footform on the machine. Also, interest has arisen in a machine of this type having a higher volume of production than that of the machine described in the above-mentioned patent application.

Accordingly, it is an object of the present invention to provide an improved machine of this type suitable for string lasting on the machine. It is a further object of the present invention to provide a machine of this type which affords comparatively high volume production.

The above problems have been met by machines of the type disclosed, for example, in United States Letters Patent No. 3,006,032, granted October 31, 1961, on an application filed in the names of Willard L. Baker et al. That patent discloses a machine which, because of the large number of stations involved (presently from eight to sixteen stations) is adapted for high volume production and may or may not be adapted for string lasting, as desired. However, as may be appreciated, that machine involves considerable expense and requires considerable space.

It is, therefore, still another object of the present invention to provide a comparatively low-cost machine having a reasonably high volume production rate and requiring a minimum of floor space in which to operate.

With the above and other objects in view, the present invention contemplates the provision in a two-station machine of dual footform assemblies which lend themselves to string lasting on the machine, means for heating the footform before the molding operation, and means for cooling the mold assembly during and after the molding operation so as to permit faster removal of the molded unit from the mold assembly. To this end there is provided as one feature of the invention an external footform heater which heats the upper on the machine before the mold charging begins. In accordance wtih a further feature of the invention there is incorporated a mold assembly forced cooling system which permits removal of the molded unit faster than would ordinarily be practicable, permitting the two mold assemblies to be used generally as quickly as the operator desires. In accordance with a still further feature of the invention, the operation of the various components is highly automated so that one operator may utilize the two stations and realize a high production rate while still having sufficient time to perform string lasting on the machine, if desired.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

Figure 1:
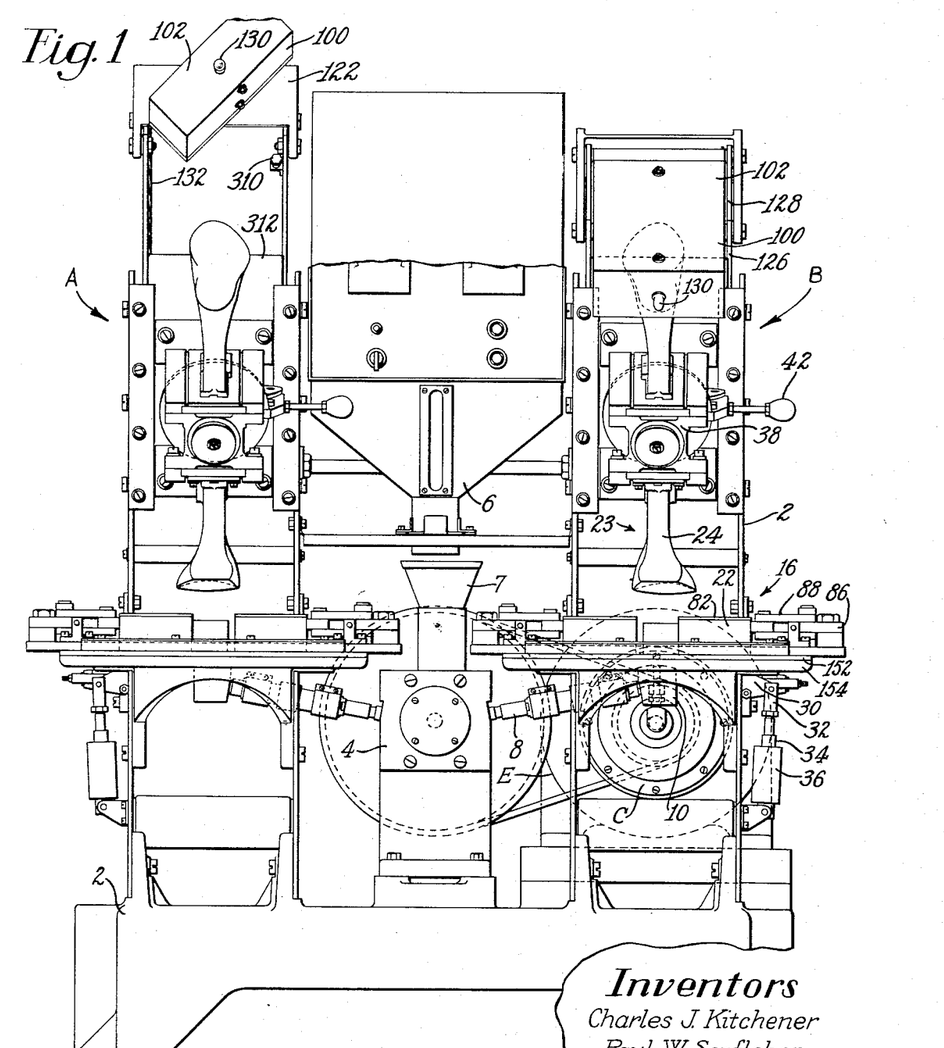
FIG. 1 is a front elevational view of one form of injection molding machine embodying the invention.
Figure 4:
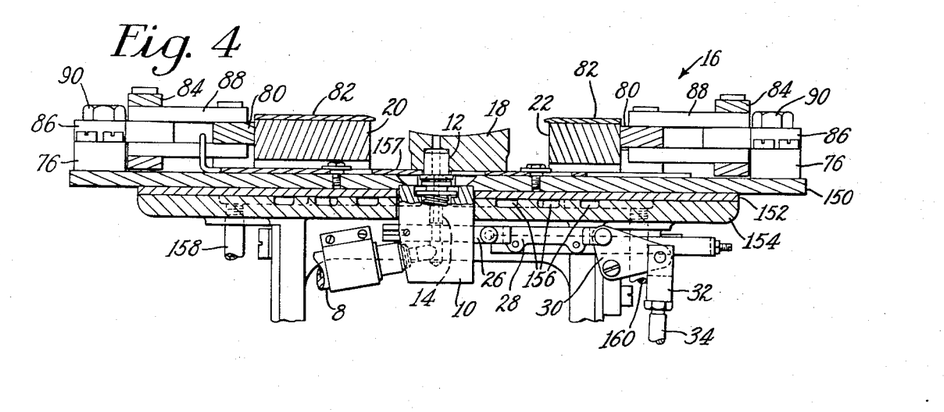
FIG. 4 is a sectional view of a mold assembly, taken along line IV—IV of FIG. 3.

Referring to FIG. 1, the invention is illustrated as embodied in a two-station machine for injection molding sole and heel units in situ onto shoe bottoms. The drawings illustrate a floor mounted machine having a base frame 2 in which there is mounted an electrical motor E (FIG. 2) from which power is transmitted through a clutch C to a plasticator 4 fed from a hopper 6 through a funnel 7. From the plasticator, fluid plastic or rubber is transmitted through two telescoping conduits 8 (FIG. 1) extending in opposite directions, each with a slightly upward inclination, to two nozzle housings 10 in two stations of the machine respectively, said stations being identified generally in FIG. 1 by reference characters A and B. The following description will be directed to the construction in station B, but it will be understood that it will be equally applicable to the construction in station A. The telescoping conduit 8 extending to the right of the plasticator 4 (as shown in FIG. 1) connects the plasticator 4 to the nozzle housing 10 which mounts an injection nozzle 12 (FIG. 4). When a passage 14 in the housing 10 extending from the conduit 8 to the injection nozzle 12 is open, fluid plastic is transmitted through the housing and the nozzle to a mold cavity which is formed by a mold assembly 16 comprising a bottom mold member 18 and two side mold members 20 and 22, and is closed at the top during the mold charging operation by a top mold member 23 which may, as illustrated, comprise the bottom of a lasted shoe mounted on a last or footform 24. The passage 14 is open or closed depending upon the position of a gate 26 connected by a link 28 to a pivotal member 30. The member 30 is positioned by a link 32 attached thereto and also attached to the end of a piston rod 34 operating in a sprue cylinder 36 (FIG. 1) pivotally fastened to the frame 2. The arrangement and operation of the plasticator 4 and conduits 8 are described in detail in the application of Leslie C. Battell, referred to hereinabove.

Figure 2:
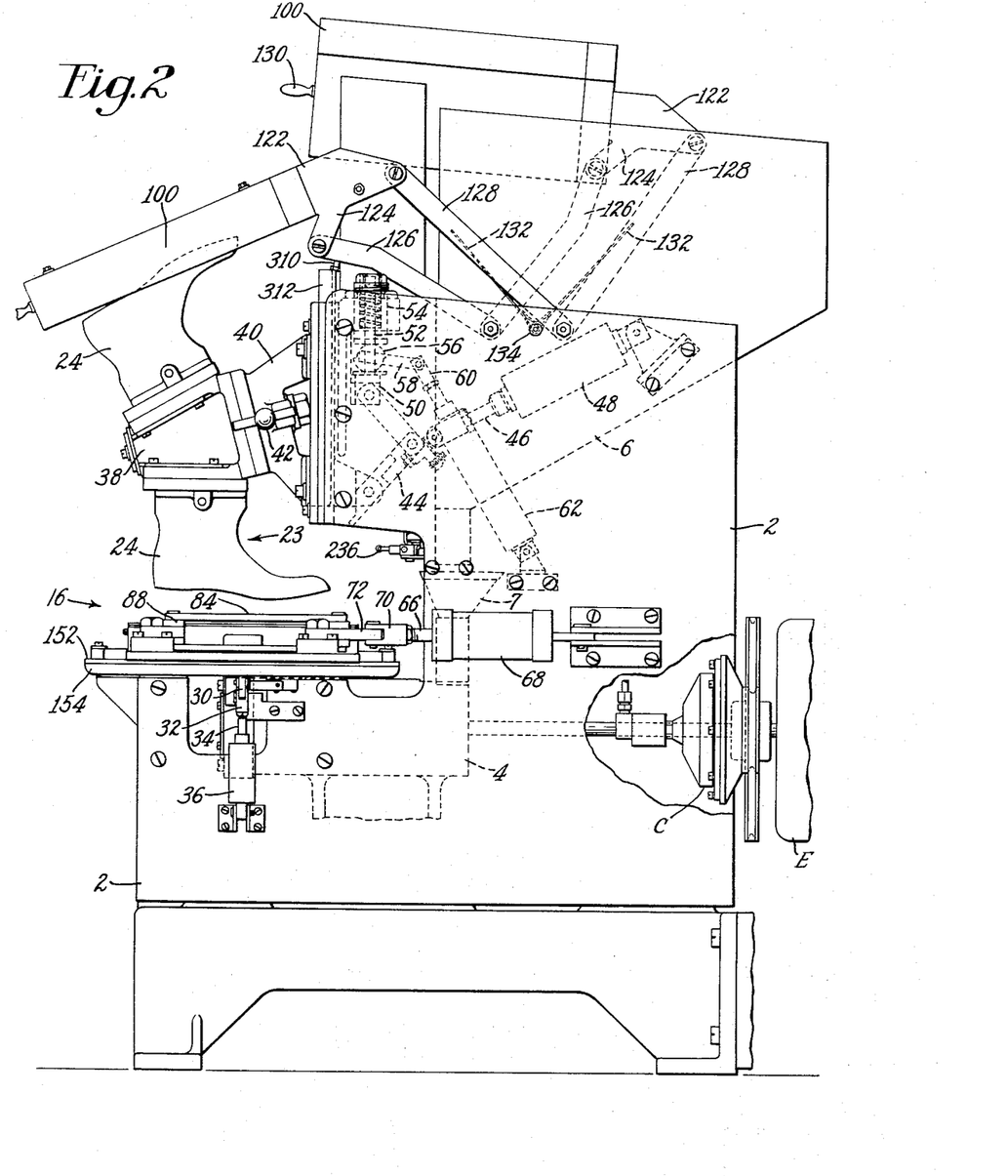
FIG. 2 is a side elevational view.

Referring to FIGS. 1 and 2, it will be seen that the present machine is provided with a footform housing 38 which supports two oppositely extending lasts or footforms 24 and which is rotatably secured to a carriage 40 mounted for vertical sliding movement on the front of the frame 2. Thus, while one footform is extending in a downward direction for a molding operation, the other footform mounted on the same housing is extending upwardly, in position for mounting a flat lasted upper, or for string lasting, and for external heating, as will be described hereinbelow. Each housing 40 is provided with a locking lever 42 for locking the housing against rotation. The footform carriage 40 has connected thereto a toggle mechanism 44 connected to a toggle cylinder piston rod 46 operating in a toggle cylinder 48 pivotally anchored to the frame of the machine. When the toggle piston rod 46 is extended the movement of the toggle mechanism 44 urges the footform carriage 40 downward toward the mold assembly 16.

The upper end of the toggle mechanism 44 is connected to a cam follower 50 which is fixed to one end of a shaft 52. The other end of the shaft 52 is received in a spring housing 54 and spring biased upwardly. Rotatably connected to the shaft 52 and held between the head of the spring housing 54 and the cam follower 50 is a cam 56. A link 58 is at one end fixed to the cam 56 and at the other end pivotally connected to a bite cylinder piston rod 60 operating in a bite cylinder 62. After the toggle cylinder 48 has caused the carriage 40 to be lowered into an intermediate position with relation to the mold assembly 16, the bite cylinder piston rod 60 extends from the bite cylinder 62 and, through the link 58, causes rotation of the cam 56 so as to urge the cam follower 50, and thereby the toggle mechanism 44 and carriage 40, downwardly another increment of distance to firmly seat the footform 24 onto the mold assembly 16.

Figure 3:
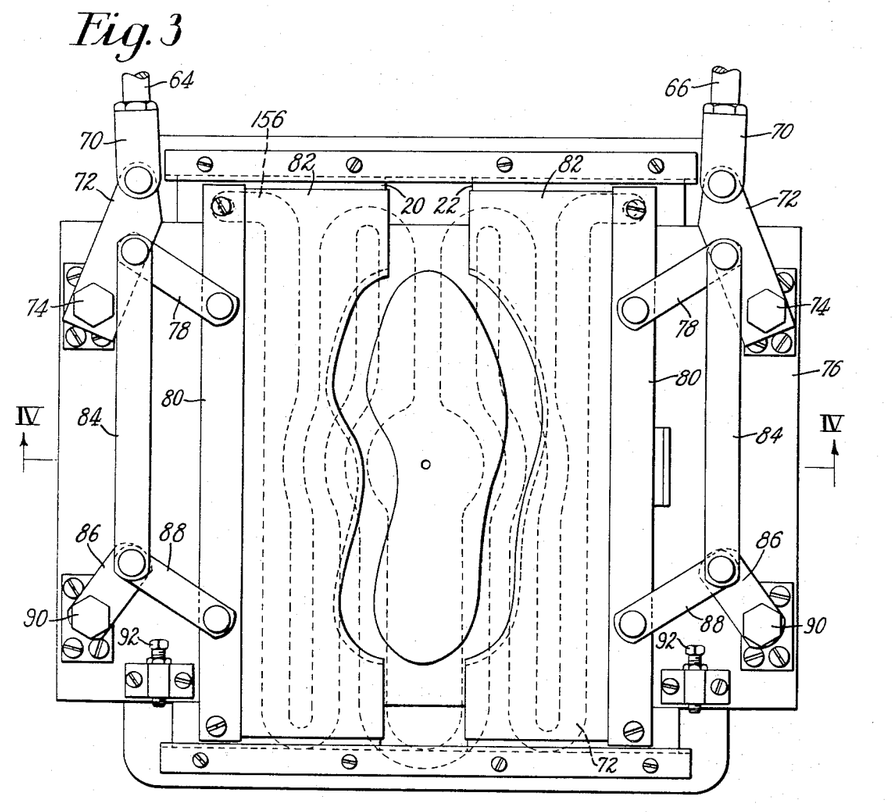
FIG. 3 is a plan view of one mold assembly.

Referring to FIGS. 3 and 4, the side mold members 20, 22 are advanced into their mutually closed positions by the concomitant operation of two side mold cylinder piston rods 64, 66 which are extensions of pistons which operate in side mold cylinders 68 (FIG. 2) attached to the frame 2. At its forward extremity each piston rod carries a yoke 70 within which there is pivotally mounted an arm 72 fulcrumed on a pin 74 mounted on a mold assembly support member 76. Fulcrumed on the arm 72 is a link 78 which is pivotally secured to an abutment member 80. The abutment member 80 is attached to the side mold memers 20, 22. A bite plate 82 is secured to the top of the side mold member. An arm 84 is pivotally secured at one end to the arm 72 and at the other end is pivotally connected to an arm 86 and a link 88, the arm 86 being fulcrumed on a pin 90 mounted in the support member 76 and the link 88 being pivotally connected to the abutment member 80. Thus, when the piston rods 64, 66 move forwardly, the side mold members 20, 22 are caused to move toward each other and toward the bottom mold member 18. An adjustable stop 92 is engaged by the link 88 to stop the movement of the side mold members 20, 22 at the centerline of the bottom mold member.

Figure 5:
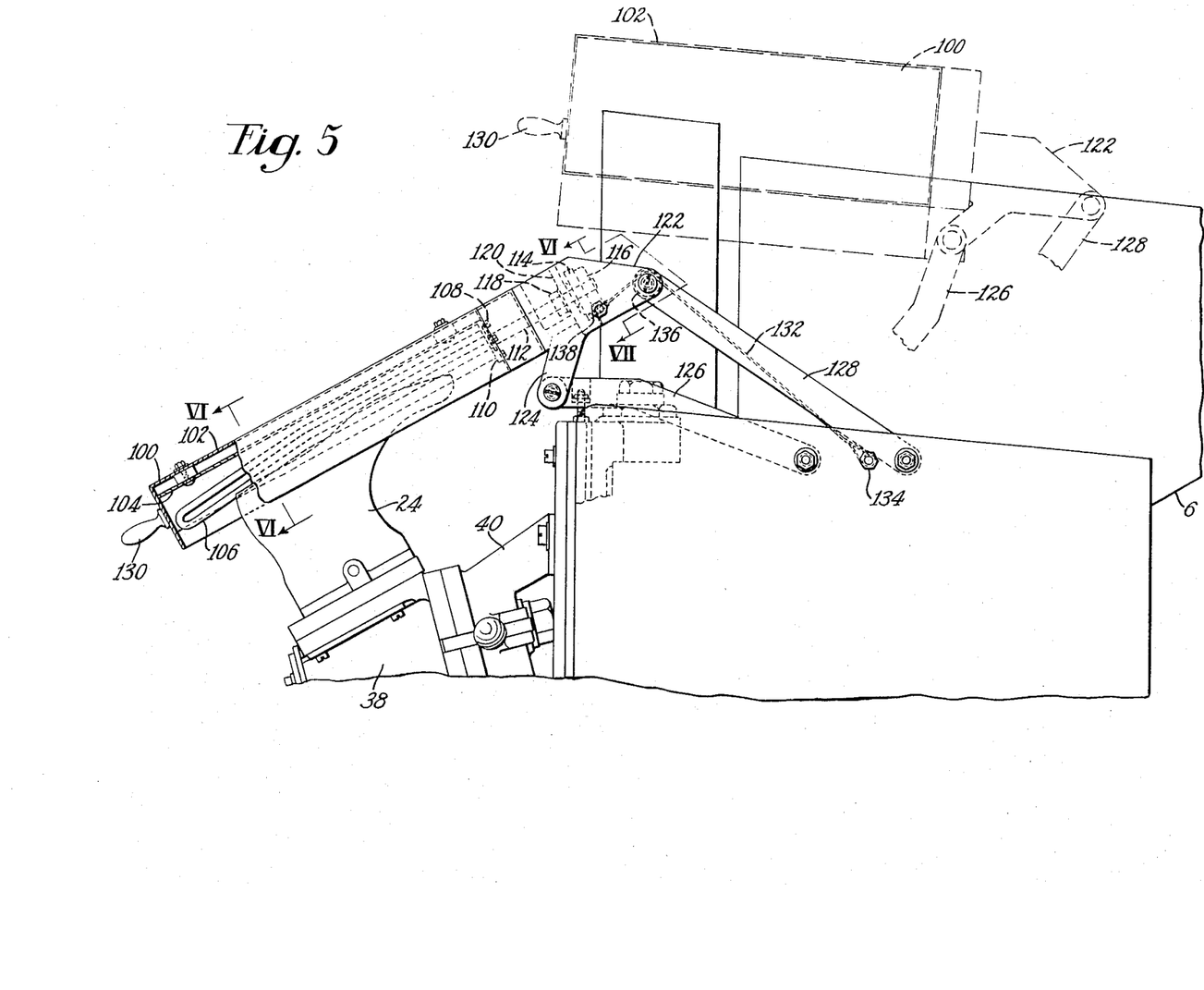
FIG. 5 is a detailed side view of one footform heating means.
Figure 6:
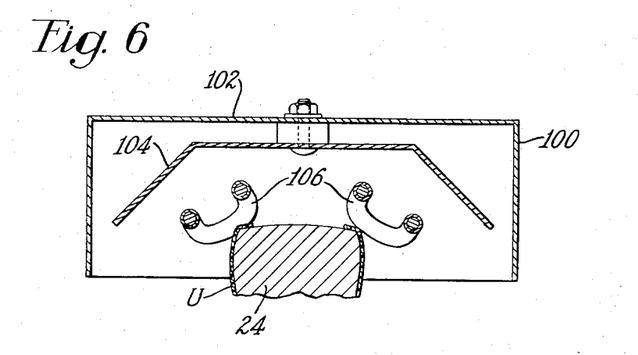
FIG. 6 is a sectional view of the footform heating means, taken along line VI—VI of FIG. 5.

Referring to FIGS. 2, 5–7, there is provided on the machine means for heating the lasted upper in the machine before subjecting the upper to the molding operation. A heat tray 100 is provided which may be pulled down over the footform and upper by the operator. The heat tray comprises a cover 102 (FIG. 6) with a reflector plate 104 and heating coils 106 mounted therein. The heat tray 100 is secured by screws 108 to a flange 110 fixed to one end of a shaft 112. Fixed to the other end of the shaft 112 is a rotary gear 114 having a hub 116. A collar 118 is mounted on the shaft 112 and abuts a bearing member 120 which is part of a heat tray holder 122. Two lugs 124 extend from the sides of the heat tray holder 122. Arms 126, 128 pivotally interconnect the heat tray holder 122 and the frame of the machine, so that the heat tray may rest in an out-of-the-way position, as indicated in FIGS. 1 and 2, or may be pulled down over the footform as is illustrated in FIGS. 2, 5 and 6. To facilitate hand operation, the tray is equipped on its forward face with a handle 130.

Figure 7:
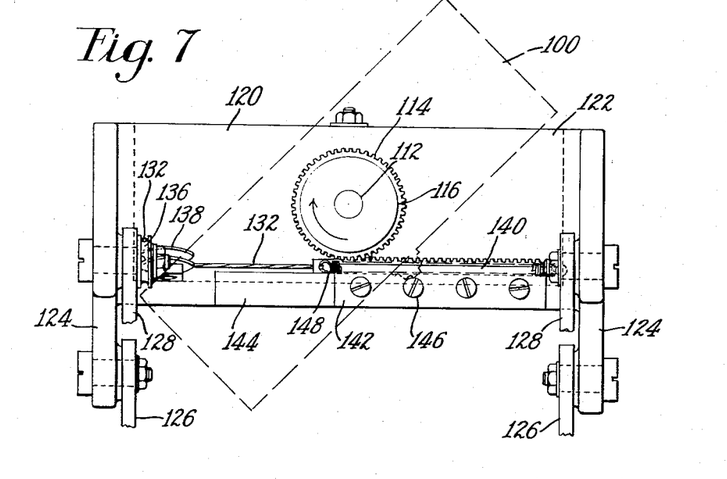
FIG. 7 is a back elevational view of the footform heating means, taken along line VII—VII of FIG. 5, and FIGS. 8a and 8b are diagrammatic drawings, showing the pneumatic system employed by one station of the machine.

Referring to FIG. 7, it will be seen that the heat tray is rotatable about the shaft 112. A cable 132 is anchored to the frame of the machine by a bolt 134 (shown in FIGS. 2 and 5). The cable 132 extends from the bolt 134 to a pulley 136 mounted in the heat tray holder 122, and thence to a second pulley 138 mounted in the heat tray holder. The cable 132 then extends to and is connected to a toothed rack 140 slidably movable in a passageway formed by guide members 142, 144 attached to the bearing member 120 by screws 146. Thus, when the heat tray 100 is urged toward its idle position by the operator, the cable 132 urges the rack 140 to the left as viewed in FIG. 7. A coil spring 148 attached at one end to the rack 140 and at the other end to a side wall of the heat tray holder exercises a restraining influence on the movement of the rack 140. As the rack moves, its teeth mesh with those of the rotary gear member 114, causing the rotary gear member to rotate. As the gear member 114 rotates so does its shaft 112 and the flange 110 fixed to one end of the shaft. Inasmuch as the rearward wall of the heat tray is fixed to the flange 110, the rotational movement is transmitted to the heat tray. When the heat tray has reached its idle position it has undergone a rotation of approximately 135°, causing the open side, or heat radiating side, to have rotated from a downward facing position to a generally upward facing position. In this manner the heat from the heat trays is directed upwardly and outwardly away from the machine when they are not in use.

When the operator is ready to apply heat to an upper U on the upwardly extending footform, he merely grasps the handle 130 and pulls the tray 100 forwardly, or to the left as viewed in FIG. 5, over the footform. The rotational movements above described are reversed, causing rotation of the heat tray to a downward facing position. Heat from the coils 106 prepares the upper for a better bond with the injection mold material.

Referring again to FIG. 4, the bottom and side mold members are disposed upon a table comprising a mold support platen 150, a cooling platen 152, and a channeled plate 154 having a single continuous groove or channel 156 cut therein. A bottom mold clamp member 157 retains the bottom mold member 18 in position but is readily releasable for interchange of bottom mold members. The channel 156 is sealed by the cooling platen 152 and in combination therewith forms a closed passageway winding beneath the mold members. An inlet tube 158 and an outlet tube 160 connect the channel 156 with a cooling fluid system (not shown). Cooling fluid, such as water, enters through the tube 158, travels beneath the cooling platen 152 and flows out the outlet tube 160. Thus, the cooling platen is always maintained at a relatively cool temperature and effects a lowering of the temperature of the mold members. By maintaining the mold assembly at a cooler temperature than is normal with ordinary air cooling, the required cooling time is reduced and the molded sole may be removed earlier than would ordinarily be permissible.

Figure 8A:
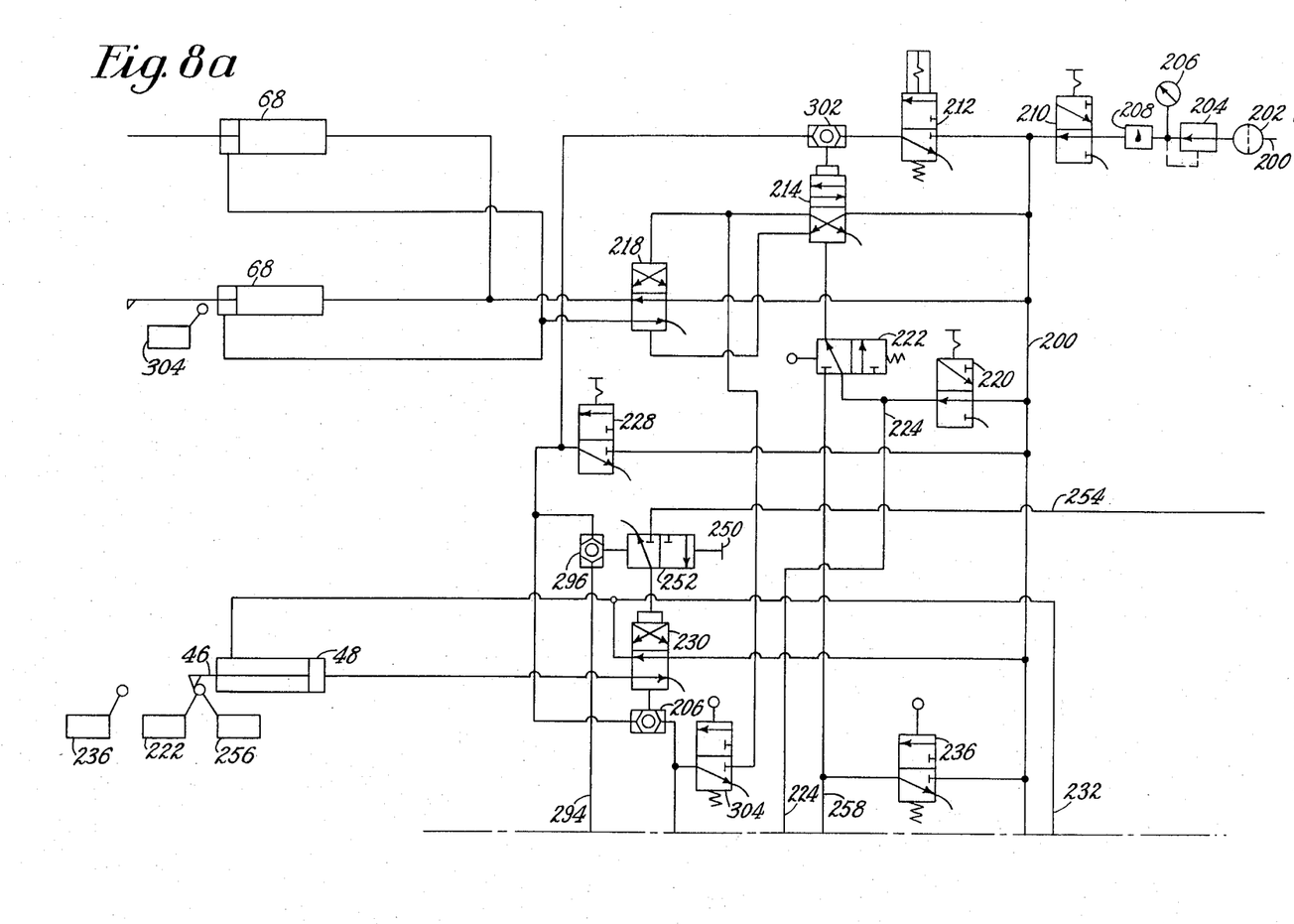
Figure 8B:
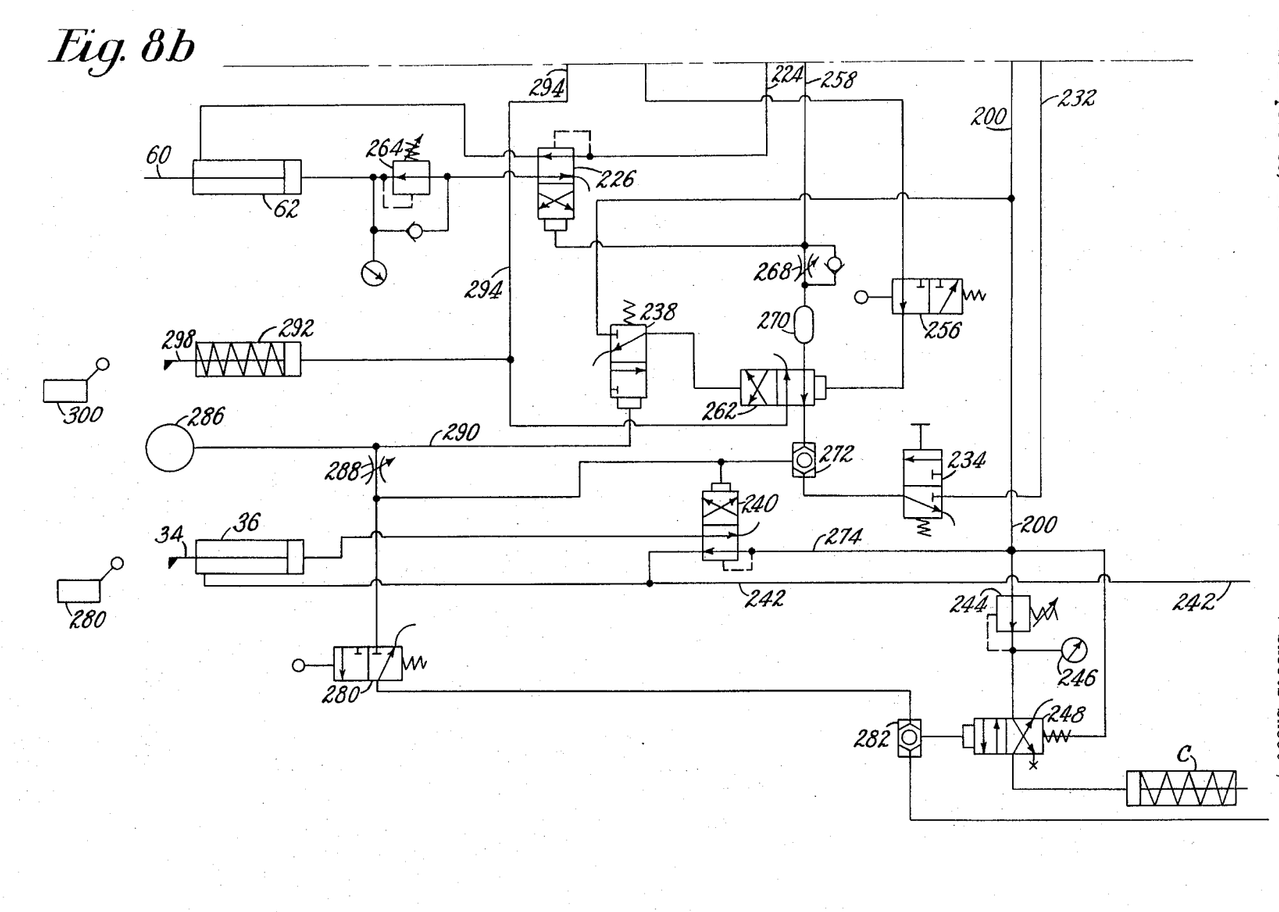

The unique pneumatic circuit of the machine which affords a highly automated operation will now be discussed. FIGS. 8a and 8b show the pneumatic circuit for one station; however, it will be appreciated that the circuit for the second station is essentially the same. Air from a main air line 200 (FIG. 8a) passes through an air filter 202 and a main air pressure regulator 204. The main air line 200 may also be equipped with a main air pressure gauge 206 and an air system oiler 208. In addition, the main air line 200 may be provided with a main air dump valve 210. Air in the main line 200 flows to a side mold solenoid valve 212. In addition, main air is fed to a side mold pilot valve 214 which directs air to a side mold four-way valve 218. Main air is also directed through the side mold four-way valve 218 to the head end of the station's two side mold cylinders 68.

Main air is also directed to a selector valve 220 which may be set for either one of two modes of operation. The selector valve in the position shown in FIG. 8a is for "top closure" operation. In this mode of operation the last mold member to enclose the mold cavity is the footform with an upper mounted thereon. The second position of the selector valve 220 permits the machine to operate as a "side closure" type machine. In the side closure operation the mold cavity is completed by the advance of the side mold members upon the footform and bottom mold member. Inasmuch as the top closure method of injection molding is prevalent in this country the operation of the pneumatic circuit for this type of molding will be fully described.

As shown in FIG. 8a, main air passes through the selector valve 220 to a toggle-up signal valve 222 and is transmitted through the toggle-up signal valve 222 to the side mold pilot valve 214 to maintain that valve in the position shown in FIG. 8a. Main air from the selector valve 220 is also directed through air line 224 to a bite cylinder four-way valve 226 (FIG. 8b) and from that valve to the rod end of the bite cylinder 62. Main air in the main air line 200 also travels to a cycle reset valve 228 (FIG. 8a) and also to a toggle cylinder four-way valve 230. Main air passes through the toggle cylinder four-way valve 230 and into the rod end of the toggle cylinder 48 and through an air line 232 to a plasticator purge valve 234 (FIG. 8b). Main air is also fed from the main air line to a toggle-down signal valve 236 (FIG. 8a) and to a telltale operating valve 238 (FIG. 8b). In addition, main air passes from the main air line 200 to a sprue cylinder four-way valve 240 and from there to the rod end of the sprue cylinder 36 and also through an air line 242 to the toggle-down signal valve of the other station. Main air also passes through a pressure reducing valve 244 which may be equipped with a pressure gauge 246 to a clutch four-way valve 248. Main air also is directed from the main air line 200 to the clutch four-way valve 248 normally to maintain the clutch valve in the position shown in FIG. 8b.

In order to start a cycle of operations the operator depresses a cycle start button 250 on a cycle start valve 252 (FIG. 8a) which permits air from the sprue cylinder four-way valve of the other station to pass from an air line 254 through the cycle start valve 252 to actuate the toggle cylinder four-way valve 230. Actuation of the toggle cylinder four-way valve 230 sends main air to the head end of the toggle cylinder 48 and exhausts air from the rod end of the toggle cylinder. The movement of the toggle cylinder piston rod 46 in the toggle cylinder 48 releases the signal valve 222 and another signal valve 256, and depresses the toggle-down signal valve 236. Depression of the toggle-down signal valve 236 permits main air to flow through that valve and to the toggle-up signal valve 222. The toggle-up signal valve has also been shifted by the movement of the toggle cylinder piston rod 46 and is in position to permit the flow of main air from the toggle-down signal valve 236 to the side mold pilot valve 214 to retain the side mold pilot valve in the position shown in FIG. 8a. Shifting of the toggle-down signal valve 236 also permits main air to travel through an air line 258 to shift the bite cylinder four-way valve 226. Movement of the toggle cylinder piston rod 46 also permits the signal valve 256 to be shifted by its spring, releasing the holding pressure on a timer reset valve 262.

Shifting of the bite cylinder four-way valve 226 (FIG. 8b) causes main air to flow through a pressure reducer 264 to the head end of the bite cylinder 62 and exhausts the rod end of the bite cylinder. Air in the line 258 also goes through a time delay valve 268 having an accumulator 270 and thence to the timer reset valve 262. From the timer reset valve 262 air passes through a sprue shuttle valve 272 to shift the sprue cylinder four-way valve 240. When the sprue cylinder four-way valve shifts, main air passes through an air line 274 through the sprue cylinder valve 240 and into the head end of the sprue cylinder 36. The sprue cylinder valve 240 also exhausts from the rod end of the sprue cylinder 36. The movement of the sprue cylinder piston rod 34 actuates a plasticator sprue valve 280 which permits air from the sprue shuttle valve 272 to pass through to a clutch shuttle valve 282 and thence to the clutch four-way valve 248 which is caused thereby to shift and allow air to operate the spring biased air clutch C. The air clutch mechanically interconnects the plasticator and the electric motor which runs continuously. It is at this point that injection commences.

An air telltale 286 is located in the mold cavity. Air from the sprue shuttle valve 272 passes through a restrictor 288 and through the air telltale 286 into the mold cavity. When the injected material has covered the air telltale 286 so that air can no longer flow therethrough, back pressure builds up in an air line 290 until the telltale operating valve 238 shifts. When the telltale operating valve shifts, main air passes through that valve to shift the timer reset valve 262 so that air from the line 258 is directed to a spring biased timer actuating cylinder 292. Air from the timer reset valve 262 also flows through an air line 294 to a shuttle valve 296 (FIG. 8a) to re-set the cycle start valve 252. When the timer actuating cylinder piston 298 extends it contacts an electrical limit switch 300 which starts an electrical timer (not shown) having set therein the desired cooling time. When the timer reset valve 262 shifts, the clutch four-way valve 248 exhausts the air clutch, thereby causing termination of the injection operation. The sprue cylinder four-way valve 240 shifts back to the position shown in FIG. 8b permitting main air to enter the rod end of the sprue cylinder 36. The electrical timer, after a proper cooling interval, sends an electrical signal to the side mold solenoid valve 212 causing that valve to shift thereby directing main air through a shuttle valve 302 to the side mold pilot valve 214 to shift that valve which in turn permits main air to shift the side mold four-way valve 218 which directs air to the rod end of the side mold cylinders 68, causing the side mold members to open. When the side molds are open a side mold signal valve 304 is actuated which directs air coming through the side mold pilot valve 214 to a shuttle valve 206 and thence to the toggle cylinder four-way valve 230, shifting the toggle cylinder valve 230 to allow air into the rod end of the toggle cylinder 48, returning the toggle cylinder piston so as to raise the footform carriage 40. As the toggle cylinder piston rod 46 is drawn into the toggle cylinder 48 the toggle-down signal valve 236 is released and the toggle-up signal valve 222 and the signal valve 256 are actuated. The actuation of the signal valve 256 (FIG. 8b) permits air to pass through that valve and to the timer reset valve 262, shifting the timer reset valve, thereby exhausting the timer actuating cylinder 292 which causes resetting of the electrical timer for the next cycle. The side mold solenoid valve 212 is returned by the spring to the position shown in FIG. 8a. The toggle-down signal valve 236, having been released by the toggle cylinder piston rod 46 shifts, allowing the bite cylinder four-way valve 226 to shift to exhaust the head end of the bite cylinder 62.

The actuation of the toggle-up signal valve 222 by the toggle cylinder piston rod 46 directs air from the selector valve 220 to shift the side mold pilot valve 214 back to its idle position. The circuit is now in condition for the start of a new cycle. To facilitate the proper actuation of various pneumatic valves, the above-described circuit is provided with pressure reducers which, for the sake of clarity, have not been included in the drawings or discussion.

The restrictor 288 is variable and may be adjusted to vary the sensitivity of the telltale operating valve 238. The restrictor is used as a size adjustment. If a large size sole is being molded, it is desirable to have the telltale operating valve remain open a short time longer than is the case for a small sole. Accordingly, the restrictor 288 is "tightened down," allowing less flow in the line 290 and putting less pressure on the telltale operating valve 238. Thus, after the telltale 286 is covered with injection molding material the time required for a pressure buildup on the valve 238 sufficient to shift that valve is longer than it was before the restrictor 288 was adjusted. The slight delay keeps the clutch four-way valve 248 open, permitting longer operation of the plasticator, thereby insuring the delivery of more fluid to the mold cavity.

The plasticator purge valve 234 is a manually operated valve which can be activated to initiate injection with the toggle cylinder not in position for a molding operation, to enable the operator to purge the plasticator of leftover or otherwise contaminated injection molding material. The cycle reset valve 228 is manually operated and upon operation causes the molds to open and the circuit to be re-set for the start of another operation.

In the event it is desired for the machine to operate as a side closure machine the operator manually shifts the selector valve 220 before initiating the next cycle. In this mode of operation the side molds remain open until the toggle-down signal valve has been actuated by the toggle cylinder piston rod. In this mode of operation the bite cylinder 62 is not actuated.

In operation, the operator first starts the electric motor E and connects the circuit with a source of pressurized air. He then pushes the purge valves 234 of both stations to clear out contaminated injection material left in the plasticator 4 and conduits 8 from the previous use. After purging the plasticator and conduits, the operator pushes the cycle re-set valves 228 to insure that the side molds are open and the circuit is in condition for a molding operation.

The operator then places an upper onto one of the upright footforms 24. The upper may be a flat lasted upper, or an upper may be string lasted directly onto the footform. At any rate, once the upper is on the footform, the operator grasps the heat tray handle 130 and pulls the heat tray 100 toward the footform. As the heat tray moves toward the footform the heat radiating side, or open side, rotates from an upwardly facing position to a downwardly facing position as hereinbefore described. The heat tray comes to rest just over the forepart of the lasted upper as shown in FIG. 2. An adjustable stop 310 engages a slide portion 312 of the footform carriage 40 to stop the downward movement of the heating tray. The operator then places a flat lasted upper, or string lasts an upper, on the upwardly extending footform in the second station and pulls the heat tray 100 down over the shoe. Having shoes on both upward extending footforms, the operator then returns to the first station and moves the heat tray back to its idle position.

By manipulation of the lever 42 the operator rotates the housing 38, causing the other footform to be brought into loading position and causing the footform having the lasted shoe thereon to move into position above the mold assembly 16. He then pushes the cycle start button for that station. The side mold cylinders cause the side mold members to close; the toggle cylinder moves the lower footform to an intermediate position with respect to the mold assembly; and the bite cylinder forces the footform downward slightly further to insure the footform's firm engagement with the mold assembly. Thereafter the sprue cylinder causes the gate member 26 to open the sprue passage 14, and the air clutch C interconnects the motor E and the plasticator to start the injection of molding material into the mold cavity. The mold charging operation continues until the air telltale system, described above, is actuated causing termination of the injection of fluid into the mold cavity. That station then remains idle for a period of time previously set in the electrical timer. Meanwhile, the operator places an upper on the upwardly extending footform of that station and pulls the heat tray down over the newly mounted upper. Since the carriage is now in the mold charging position the tray fits over the lasted upper as shown in FIG. 5.

The operator returns to the second station, removes the heat tray from the upwardly extending footform, rotates the footform housing of that station and pushes the cycle start button for the second station. He then places an upper on the upwardly extending footform of that station; and pulls the heat tray down over the newly mounted upper. In the meantime the electrical timer in the first station will have caused the side mold members of that station to open and the carriage to be elevated to its uppermost position. The operator then returns to the first station, removes the heat tray and rotates the footform housing. He removes the sprue from the newly molded sole with a sharp instrument and removes the upper with the sole unit molded thereon from the upwardly extended footform. He may then place another upper on that footform, pull down the heat tray and start a new injection molding cycle. The two stations of the machine are pneumatically interconnected so that when one station is injecting, the toggle cylinder of the other station is not operative. This prevents simultaneous injection into both mold cavities which would cause undesired fluctuation of injection pressure.

The above description of the operation of the machine is intended to be illustrative only and may obviously be changed to meet varying conditions such as the length of time heating of the upper is required to cool the molded unit so that it may safely be removed from the mold cavity. It is the purpose of the heat tray and the mold assembly forced cooling means to minimize these times.

Having thus described our invention what we claim as new and desire to secure by Letters Patent of the United States is:

1. An injection molding machine comprising a frame, a mold assembly mounted on said frame, a top mold member mounted for movement on said frame, means mounted on said frame for moving said top mold member into engagement with said mold assembly for forming a mold cavity, table means mounted on said frame for supporting said mold assembly, said table means having at least one conduit therein for the flow of cooling fluid therethrough, and means for charging said mold cavity with injection molding material.

2. An injection molding machine comprising a frame, a top mold member mounted for movement on said frame, bottom and side mold members mounted on said frame, means mounted on said frame for moving said top mold member and said side mold members into engagement for forming with said bottom mold member a mold cavity, table means mounted on said frame for supporting said bottom and side mold members, said table means having at least one conduit therein for the flow of cooling fluid therethrough, and means for charging said mold cavity with injection molding material.

3. An injection molding machine for molding soles in situ onto lasted footwear comprising a frame, a footform mounted for movement on said frame, a mold assembly comprising bottom and side mold members mounted on said frame, a plate mounted on said frame for supporting said bottom mold member, said plate having at least one conduit therein for the flow of cooling fluid therethrough, means mounted on said frame for moving said footform toward and away from said mold assembly, and means for charging said mold assembly with injection molding material.

4. An injection molding machine comprising a frame, a top mold member mounted for movement on said frame, a mold assembly mounted on said frame, a table mounted on said frame for supporting said mold assembly, means mounted on said frame for moving said top mold member into engagement with said mold assembly for enclosing a mold cavity, and means for charging said mold cavity with injection molding material, said table comprising a channeled plate having at least one groove in its mold facing surface, a cooling platen flush with the mold facing surface of said channeled plate thereby to cover said groove, and a support platen flush with the mold facing surface of said cooling platen, fluid inlet and outlet means connected to said channeled plate and leading into and out of said groove whereby to afford a conduit in said table for the passage of cooling fluid therethrough.

5. An injection molding machine comprising a frame, a top mold member mounted for movement on said frame, bottom and side mold members mounted on said frame, a table mounted on said frame for supporting said bottom and side mold members, means mounted on said frame for moving said top mold member and said side mold members into engagement for forming with said bottom mold member a mold cavity, and means for charging said mold cavity with injection molding material, said table comprising a channeled plate having at least one groove in its mold facing surface, a cooling platen flush with the mold facing surface of said channeled plate thereby to cover said groove, and a support platen flush with the mold facing surface of said cooling platen, fluid inlet and outlet means connected to said channeled plate and leading into and out of said groove whereby to afford a conduit in said table for the passage of cooling fluid therethrough.

6. An injection molding machine for molding soles in situ onto lasted footwear comprising a frame, a footform mounted for movement on said frame, a mold assembly mounted on said frame, a table mounted on said frame for supporting said mold assembly, means mounted on said frame for moving said footform into engagement with said mold assembly for enclosing a mold cavity, and means for charging said mold cavity with injection molding material, said table comprising a channeled plate having at least one groove in its mold facing surface, a cooling platen flush with the mold facing surface of said channeled plate thereby to cover said groove, and a support platen flush with the mold facing surface of said cooling platen, said channeled plate having fluid inlet and outlet means attached thereto and in communication with said groove whereby to afford cooling means for said table and said mold assembly.

7. An injection molding machine for molding soles in situ onto lasted footwear comprising a frame, a footform mounted for movement on said frame, a mold assembly mounted on said frame, means mounted on said frame for moving said footform toward and away from said mold assembly, said footform being engageable with said mold assembly, a heat tray mounted on said frame, said heat tray being movable to cover said footform when said footform is not in a molding position, said heat tray having one heat radiating side, and automatic means for rotating said heat tray about its longitudinal axis for directing the heat radiating side of the tray toward the footform when said heat tray is in a footform heating operation and for directing said heat radiating side of the tray outwardly from said footform when said heat tray is not in a footform heating operation.

8. An injection molding machine for molding soles in situ onto lasted footwear comprising a frame, at least one footform mounted for movement on said frame, a mold assembly mounted on said frame, means mounted on said frame for moving said footform toward and away from said mold assembly, said footform being engageable with said mold assembly, said footform being selectively movable to extend downwardly toward the mold assembly or upwardly for the fitting of an upper thereon, a heat tray pivotally connected to said frame and movable from a rest position to a position whereby to cover said footform in its upwardly extending position, said heat tray having a heat radiating side, and gear means for automatically rotating said heat tray about its longitudinl axis when it is moved from one position to the other for directing said heat radiating side downwardly when over said footform for heating an upper mounted thereon and for directing said heat radiating side upwardly when said heat tray is in its rest position.

References Cited

UNITED STATES PATENTS

| 2,994,920 | 8/1961 | Patera | 18—34 X |
| 3,199,149 | 10/1965 | Croyle | 18—17 |
| 3,203,049 | 10/1965 | Brown et al. | 18—17 |
| 3,255,491 | 6/1966 | Hardy | 18—17 |

FOREIGN PATENTS

| 159,631 | 1/1963 | Russia. |
| 1,151,200 | 7/1963 | Germany. |

WILBUR L. McBAY, *Primary Examiner.*